Aug. 11, 1964   G. R. DEMPSTER ETAL   3,144,149
TRANSPORTING EQUIPMENT FOR CONTAINERS
Original Filed June 24, 1958   8 Sheets-Sheet 1
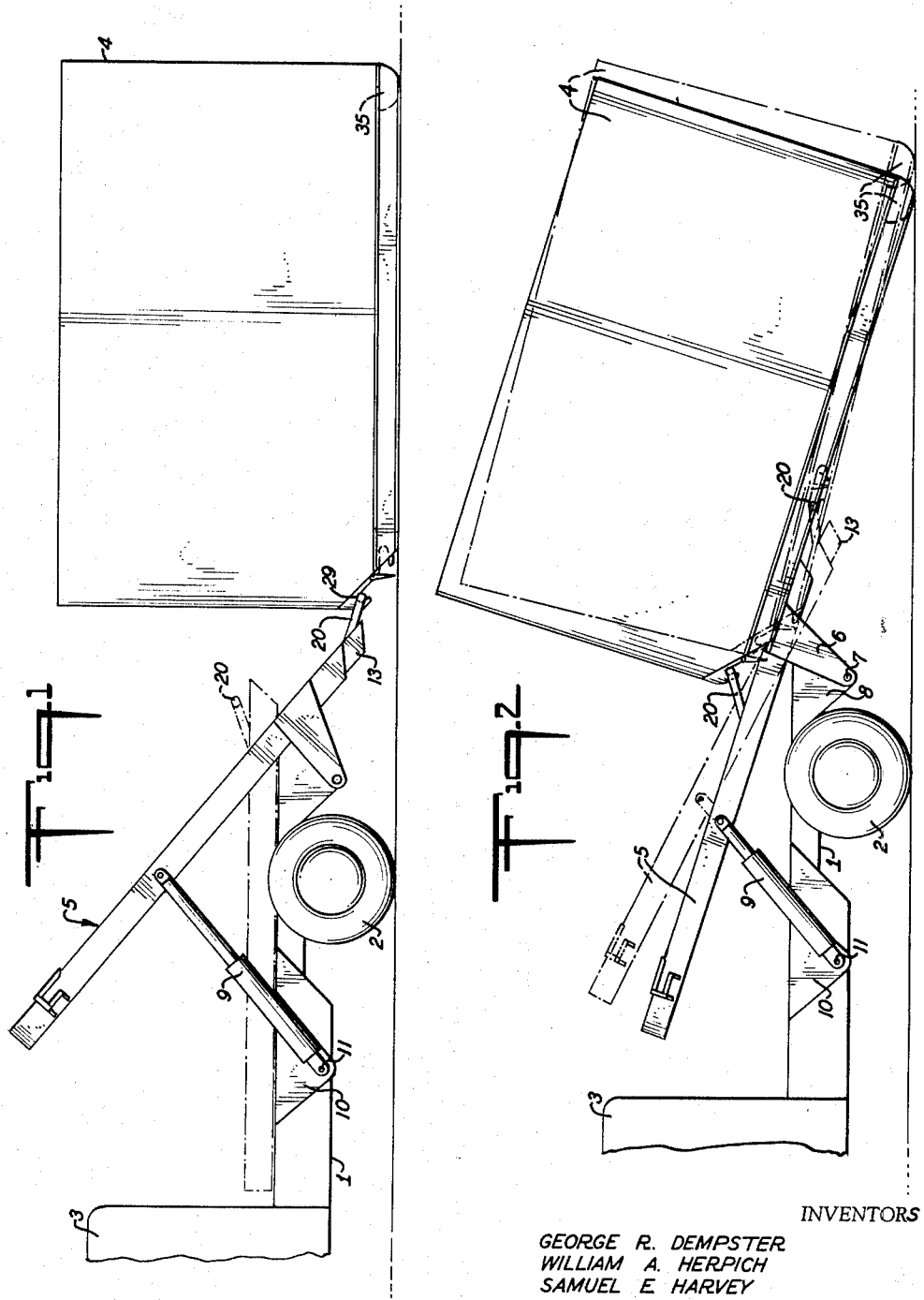
INVENTORS
GEORGE R. DEMPSTER
WILLIAM A. HERPICH
SAMUEL E. HARVEY
BY
ATTORNEYS

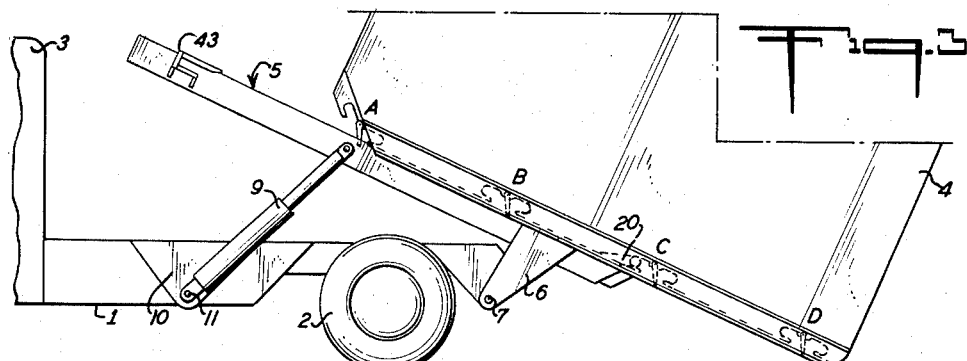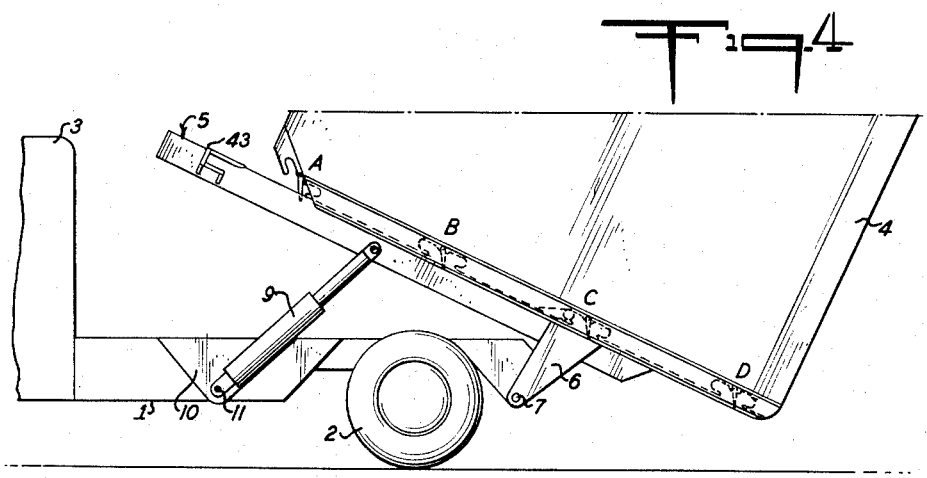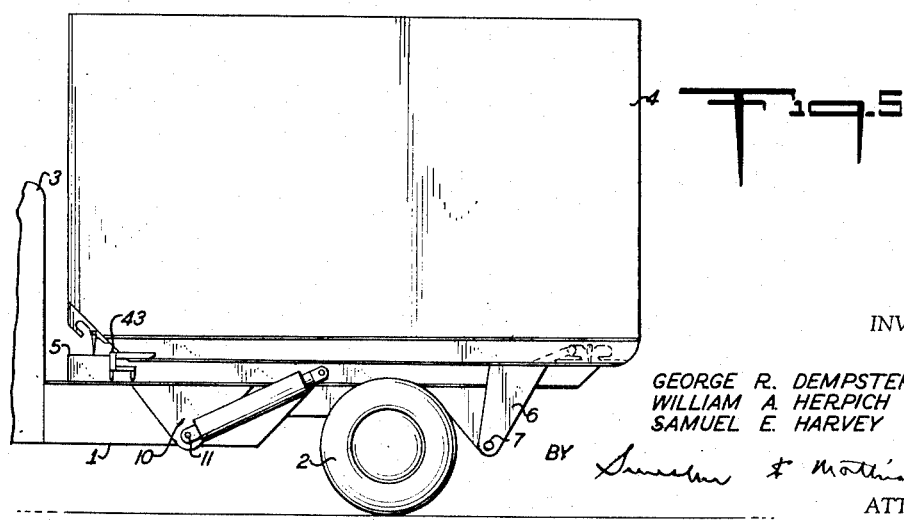

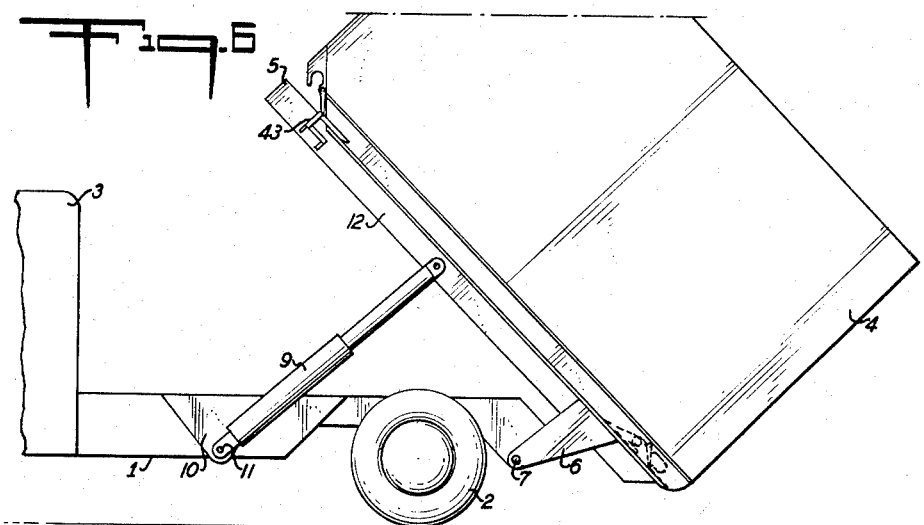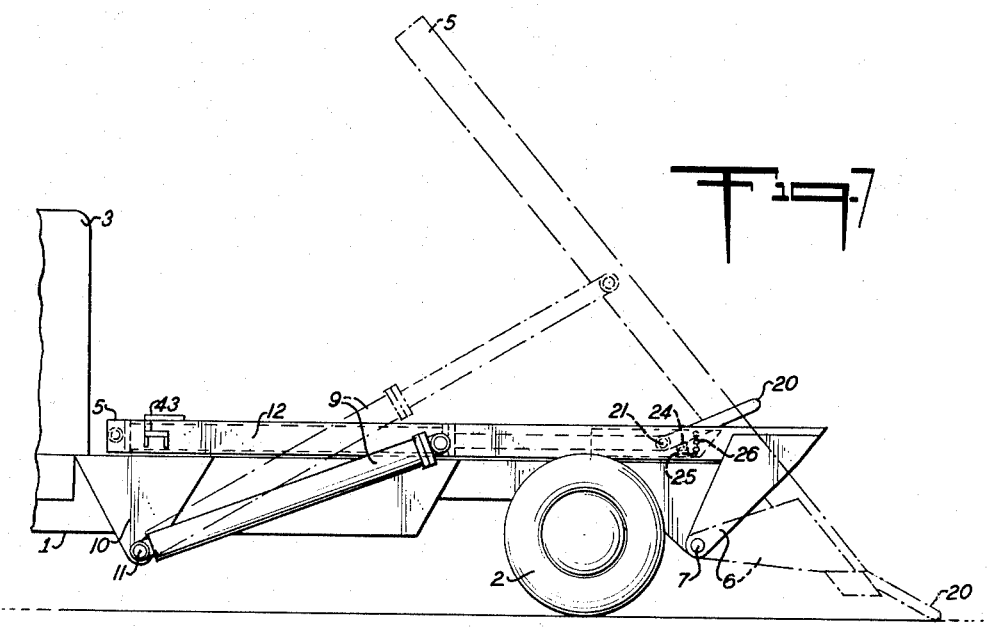

Aug. 11, 1964 G. R. DEMPSTER ETAL 3,144,149
TRANSPORTING EQUIPMENT FOR CONTAINERS
Original Filed June 24, 1958 8 Sheets-Sheet 4
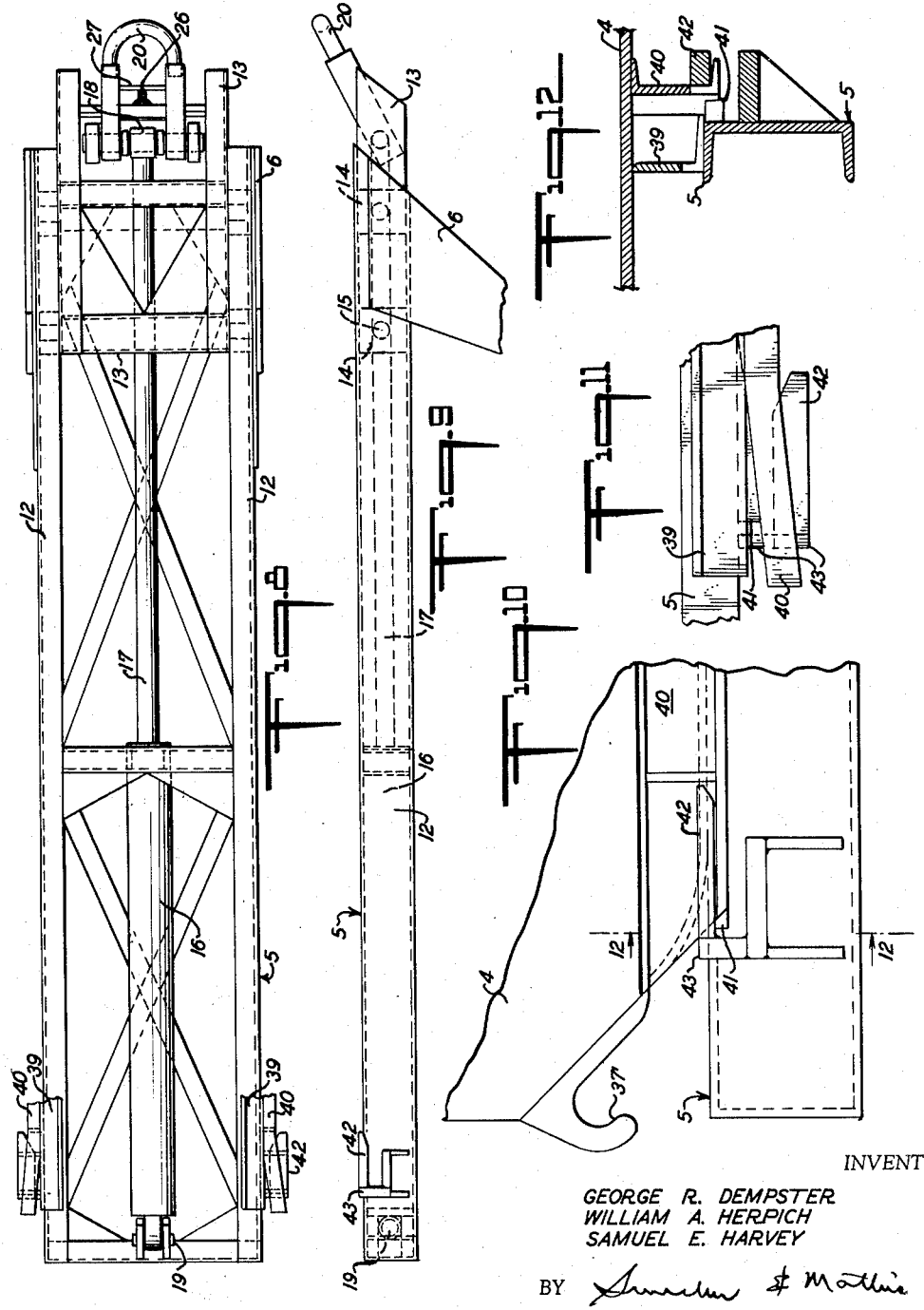
INVENTORS
GEORGE R. DEMPSTER
WILLIAM A. HERPICH
SAMUEL E. HARVEY
BY
ATTORNEYS Aug. 11, 1964   G. R. DEMPSTER ETAL   3,144,149
TRANSPORTING EQUIPMENT FOR CONTAINERS
Original Filed June 24, 1958   8 Sheets-Sheet 5
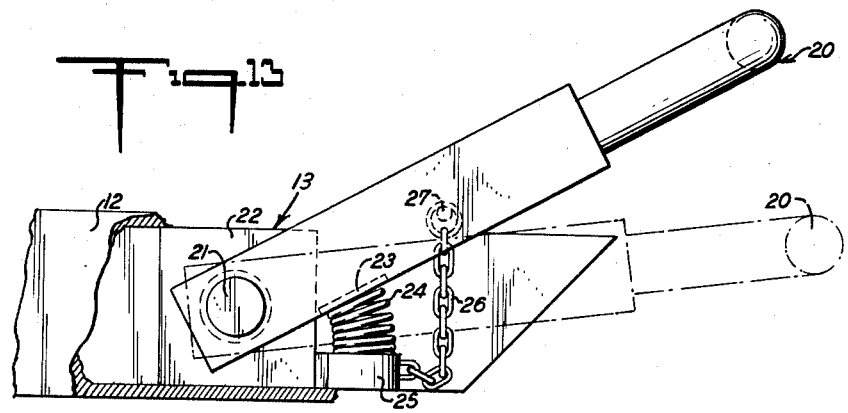
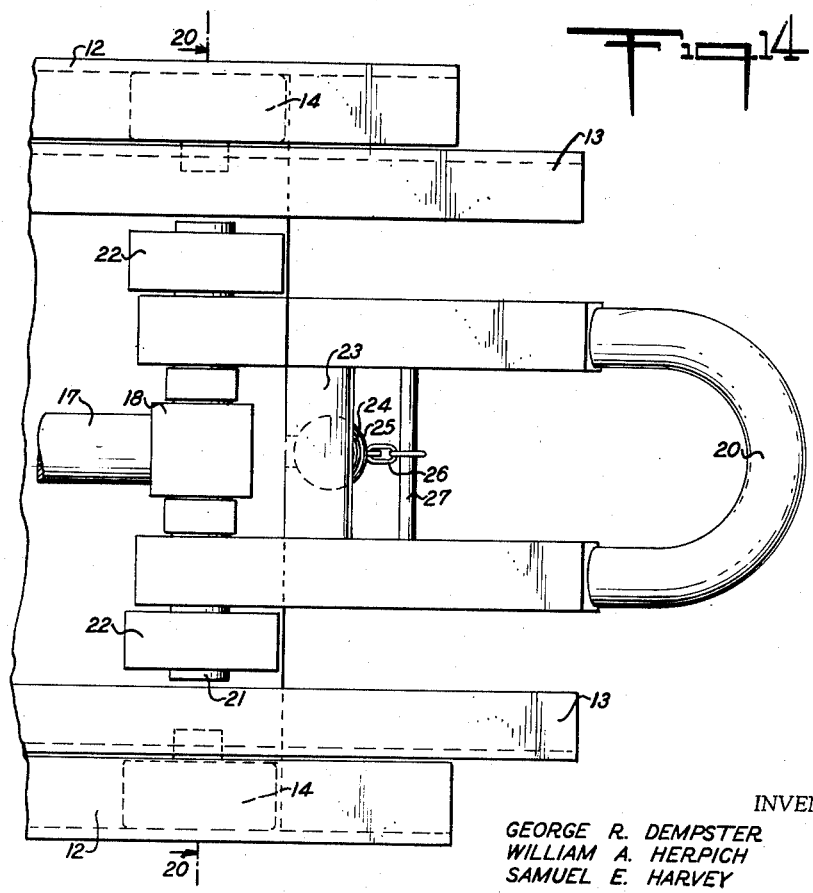
INVENTORS
GEORGE R. DEMPSTER
WILLIAM A. HERPICH
SAMUEL E. HARVEY
BY
ATTORNEYS Aug. 11, 1964  G. R. DEMPSTER ETAL  3,144,149
TRANSPORTING EQUIPMENT FOR CONTAINERS
Original Filed June 24, 1958  8 Sheets-Sheet 6
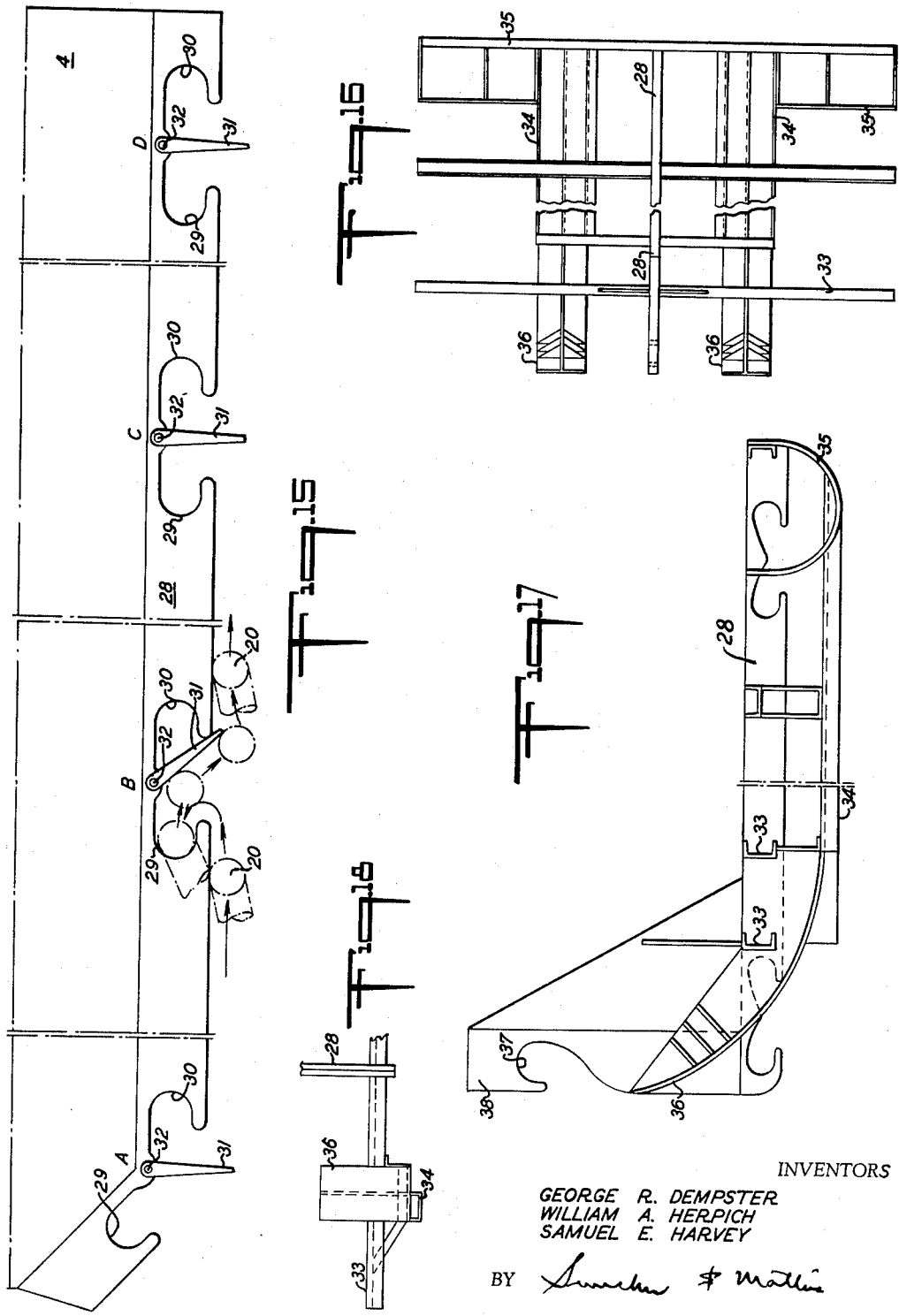
INVENTORS
GEORGE R. DEMPSTER
WILLIAM A. HERPICH
SAMUEL E. HARVEY
BY
ATTORNEYS

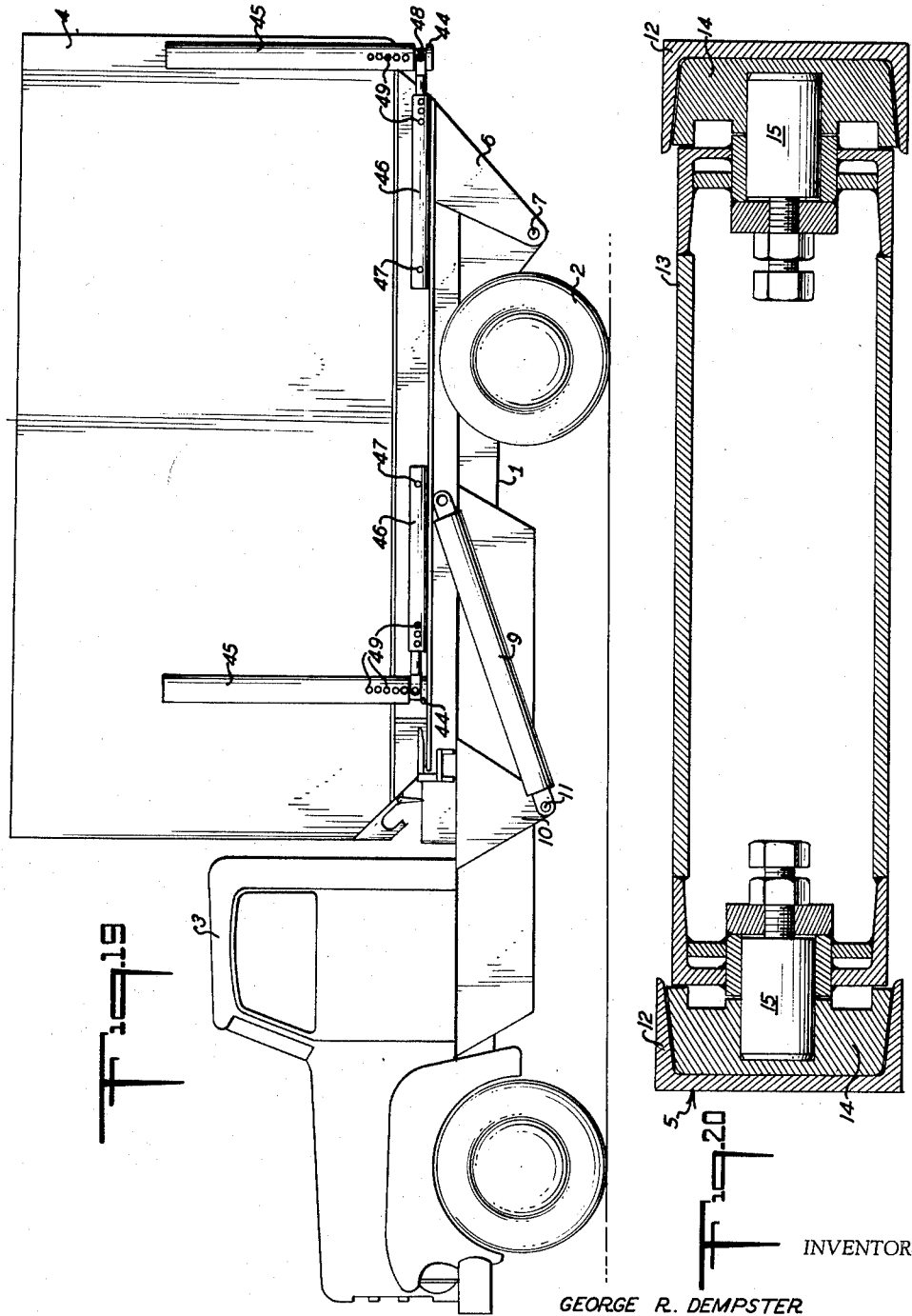

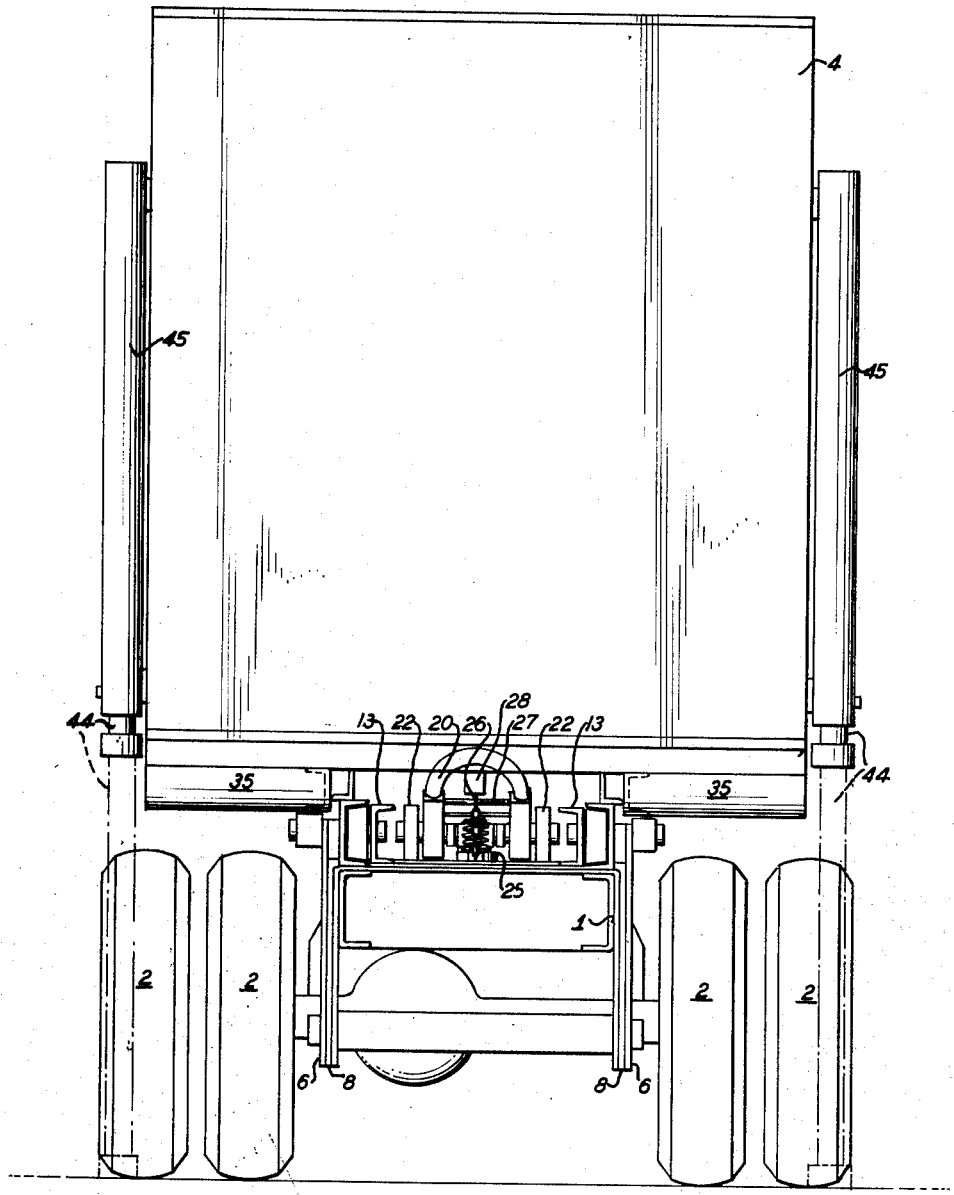

United States Patent Office 3,144,149
Patented Aug. 11, 1964

3,144,149
TRANSPORTING EQUIPMENT FOR CONTAINERS
George R. Dempster, Box 3127, Knoxville, Tenn., William A. Herpich, Galion, Ohio, and Samuel E. Harvey, Knoxville, Tenn.; said Herpich and said Harvey assignors to Dempster Brothers, Inc., Knoxville, Tenn., a corporation of Tennessee
Continuation of application Ser. No. 744,107, June 24, 1958. This application Apr. 20, 1961, Ser. No. 106,427
11 Claims. (Cl. 214—505)

This invention relates to improvements in transporting equipment for containers and more particularly for use with large containers of the order of vehicle bodies. This is a continuation of copending application Serial No. 744,107, filed June 24, 1958, now abandoned.

It is often desirable to load vehicle bodies separate and apart from the vehicles on which they are to be transported. This is especially true of a van-type body of large capacity which can be filled when sitting on the ground or other surface, after which it can be picked up, loaded on a vehicle chassis and transported to a remote point where it can be unloaded or the contents discharged or removed therefrom. Then, the body can bbe returned to the point of filling or moved to other point where desired.

Various attempts have been made heretofore to provide transporting devices for a body of this character, but these have not been entirely satisfactory. Most of such attempts have involved the use of a cable-type hoisting means, but the use of cables for this purpose prevents automatic pick up of the body, requires manual attachment of the cables, with attendant extra labor required, and in some municipalities the use of cables for this purpose is prohibited. Moreover, cable devices are objectionable for other reasons, including the difficulty in removing the container from the vehicle chassis by such a cable device.

One object of this invention is to improve the construction of equipment for handling a detachable body or container, for loading and unloading the same on a vehicle chassis.

Another object of the invention is to provide for the automatic pick up of a separate body or container, without requiring manual attachment thereof to the hoisting means on the vehicle.

Still another object of the invention is to provide for the discharge of the body or container onto a dock or other elevated surface, without any tipping action of the hoisting means and under the entire control of the operator in the cab of the vehicle.

A further object of the invention is to provide for a step-by-step shifting of the container onto a tilting frame on the vehicle chassis and locking the body in place thereon, as well as to remove the same therefrom when desired, all within the control of the operator in the cab and without requiring manual action at the point of attachment.

These objects may be accomplished, according to certain embodiments of the invention, by constructing a body or detachable container with means on the bottom thereof which may be engaged selectively and successively by a shuttle action. This means preferably is in the form of opposed hooks connected with the supporting frame structure of the body or container and spaced at intervals along the length thereof. Thus, these hooks can be engaged successively by a shuttle motion in moving the body or container onto or off the vehicle chassis automatically under the control of the operator in the cab. The body or container is so constructed as to facilitate the sliding action thereof, both with respect to the ground or other surface on which it may be sitting and along the surface of the vehicle chassis as it skids into position thereon.

The vehicle chassis preferably is constructed with a tilting frame mounted thereon adapted to receive the body or container. Provision is made for tilting this frame to an elevated position, either for receiving or discharging the body or container.

A carriage device is mounted on the frame so as to be reciprocated lengthwise thereof and preferably includes a bail which can be engaged step-by-step and successively with the several hooks on the bottom of the container for shifting the latter onto or off of the vehicle chassis. This shifting action can occur either when the frame is in an elevated position or when it is horizontal, flat on the vehicle bed. Thus, it is possible to shift the container onto an elevated platform or support without tilting of the frame or the container; or the body can be lowered to the ground ready for refilling.

These embodiments of the invention are illustrated in the accompanying drawings, in which:

FIG. 1 is a side elevation of a vehicle chassis and body or container, with the tilting frame elevated and in position for initial attachment to the body;

FIG. 2 is a similar view, showing the movement of the container or body to its initial position on the tilting frame;

FIGS. 3, 4 and 5 are successively advanced steps in the positioning of the body on the chassis;

FIG. 6 is a similar view, showing the body tilted in dumping position;

FIG. 7 is a side elevation of the vehicle chassis, with the tilting frame mounted thereon;

FIG. 8 is a top plan view of the tilting frame and carriage;

FIG. 9 is a side elevation thereof;

FIG. 10 is an enlarged side elevation, showing the connection of the body or container with the front end portion of the tilting frame;

FIG. 11 is a partial plan view thereof;

FIG. 12 is a detail cross section on the line 12—12 in FIG. 10;

FIG. 13 is a side elevation, partly in section, showing the bail mounting and operating means;

FIG. 14 is a top plan view thereof;

FIG. 15 is a diagrammatic view, showing the hook and shuttle means on the bottom of the container;

FIG. 16 is a top plan view of the front end portion of the container runner structure;

FIG. 17 is a side elevation thereof;

FIG. 18 is a front elevation thereof;

FIG. 19 is a side elevation of a vehicle body and including means for supporting the body in elevated position;

FIG. 20 is a detail cross section on the line 20—20 in FIG. 14; and

FIG. 21 is a rear elevation of the modification shown in FIG. 19.

The invention is illustrated as applied to a vehicle chassis of conventional form wherein the chassis frame is indicated generally at 1 and supported by wheels 2, being power driven in the usual or desired manner under the control of an operator within a cab 3. The chassis frame should be of sufficient length to receive thereon and to accommodate the vehicle body or container, although it is not necessary that the container be located entirely forwardly of the rear wheels.

The container is illustrated generally at 4. Usually, the container is of large capacity of the order of a vehicle body, although the size and length of the container may be varied as found desirable for the purpose. The relation of the container with reference to the length of the vehicle chassis is illustrated generally in FIGS. 1 to 6 and 19 as examples that may be used for the purpose.

Mounted on the chassis frame 1 is a tilting frame 5 capable of being moved to different augular positions with respect thereto, as illustrated in FIGS. 1 to 6. The tilting frame 5 projects rearwardly of the chassis frame 1 and has supporting brackets 6 on the rear end portions thereof extending downwardly at opposite sides of the chassis frame. The lower ends of the brackets 6 are pivotally supported at 7 on hanger brackets 8 that depend from the opposite sides of the chassis frame 1. This forms a pivotal support for the tilting frame 5 on the chassis frame 1 at the rear end portion of the latter, permitting the tilting frame to shift to the different angular positions illustrated.

The tilting frame 5 may be raised and lowered with respect to the chassis frame 1 by any suitable means, although we prefer to use hoisting cylinders, generally indicated at 9, connected with opposite sides of the tilting frame 5. These cylinder assemblies extend downwardly from the tilting frame 5 to mounting brackets 10 on the front end portion of the chassis frame 1, being pivotally connected therewith at 11. The cylinders 9 may be telescopic or double acting, or other suitable cylinders, and operate in the usual manner under the action of hydraulic or pneumatic pressure, preferably in the form of hydraulic cylinders, for raising and lowering the tilting frame 5 with respect to the chassis frame.

As shown in FIGS. 8 to 14 and 20, the tilting frame 5 is formed preferably of a pair of opposed channels or guides 12, suitably braced and connected in rigid relation, as will be apparent from FIG. 8. The channels or guides 12 form opposed guideways. Operatively mounted within the guides 12 of the tilting frame is a carriage 13 supported on rollers or guide blocks 14 mounted within the guideways for movement lengthwise thereof. Pins 15 (FIG. 20), connected with the carriage 13, extend into the rollers or blocks 14, and form an operative connection thereof with the carriage. The parts of the carriage may be welded or otherwise secured in rigid relation to each other, so that the carriage will move lengthwise in the guideways 12 adjacent the rear end of the tilting frame 5 and may project from the rear end, as desired (see FIGS. 13 and 14).

The carriage 13 is operated in a reciprocating motion by a power device, such for example, as a hydraulic cylinder, indicated generally at 16. The cylinder 16 has the piston rod 17 thereof extending to an eye 18 on the platform or frame of the carriage 13. The opposite end of the cylinder 16 is pivotally connected at 19 with the end member of the tilting frame 5.

Also mounted on the platform or frame of the carriage 13 is a bail 20, having the opposite sides thereof mounted on a journal pin 21 that extends through the eye 18 and through the blocks 22 mounted on the platform or frame of the carriage 13.

The opposite sides of the bail 20 are connected together by a bar 23 which is engaged by one end of a spring 24, the opposite end of which spring 24 is received within a cup 25 securely mounted on the platform or frame of the carriage 13. This spring 24 is shown to be a coiled compression spring, although any other suitable type of spring may be used, as desired. Means is provided for limiting the upward swinging movement of the bail and preventing it from riding over on its pivot pin 21. This means may be in any suitable form, such as a bar or the like. In the form shown, this stop means comprises a chain 26 connected at one end with the cup 25 and at the opposite end with a bar 27 that also extends between the arms of the bail 20.

The bottom portion of the container or body 4 is provided with a hook bar 28 extending lengthwise thereof and which may form the center bar of the supporting structure of the container. This hook bar 28 preferably extends throughout the length of the container and is provided with a plurality of hook stations spaced at intervals along the length thereof, as indicated generally at A, B, C and D, in FIGS. 3, 4 and 15. The number and spacing of these hook stations may be varied, as desired, depending upon the length of the container or body and the length of travel of the bail 20.

Each of the hook stations is formed preferably of a pair of opposed open hooks 29 and 30, with a depending shuttle 31 pivotally supported at 32 on the bar 28 between the hooks 29 and 30. Each of the hooks 29 and 30 is formed as a recess, open toward the shuttle 31 and of such size and position as to be engaged by the bail 20 in a manner hereinafter described and illustrated in FIGS. 1 to 6 and in FIG. 15. The hooks 29 are forwardly of the respective shuttles, while the hooks 30 are rearwardly thereof. These respective forward and rearward hooks are adapted to be used for moving the body or container 4 forwardly or rearwardly lengthwise relative to the tilting frame 5.

The undercarriage of the container 4 is illustrated in FIGS. 16 to 18. The body of the container may be of any usual or desired construction and should be suitably supported and braced so as to be sturdy and rigid for handling in the manner herein described. As noted above, the hook bar 28 extends lengthwise substantially throughout the length of the body at the center thereof, and the sides and bottom of the body are suitably braced and supported on transverse ribs 33, according to this embodiment, which transverse ribs 33 extend across from side to side of the body and are spaced at intervals along the length thereof sufficiently to assure a suitable bracing and supporting of the container and its contents.

Also extending lengthwise on opposite sides of the hook bar 28 under the cross ribs 33 are channel or box sections 34 which support and brace the undercarriage structure of the body and also form runners therefor, upon which the body may be supported both when sitting on the ground or other surface and when pulled lengthwise onto the tilting frame 5 of the vehicle. These runners 34 may be provided with transverse rolled sections 35 at the rear extending laterally therefrom, respectively. At the forward ends of the runners 34 are upturned sections 36 to facilitate the guiding and lengthwise sliding movement of the container.

In addition to the several hook stations described, the hook bar 28 may be provided, if desired, with an attaching hook, as indicated at 37, in a gooseneck portion 38 connected with the front end of the hook bar 28, as shown in FIG. 17. This attaching hook 37 may be engaged initially by the bail 20 for aligning the container or body with the vehicle, or for moving the container up to the desired position relative to the vehicle before the connecting action takes place. It may be used also for receiving a safety connection with the chassis, to insure holding the container in place on the vehicle, if such attachment be regarded as material. A hook on the container 4 for a similar purpose is shown at 37' in FIG. 10.

The tilting frame 5 preferably has mounted thereon and extending lengthwise of the members 12 body slides, indicated at 39, in position to receive guide members 40 connected with the undercarriage of the body 4, as illustrated in FIG. 8. The front ends of the body guides 40 are flared out to assure positive centering of the body on the tilting frame 5 when it is first brought onto the frame. As the body is brought forward on the tilting frame 5 to the full forward position, centering wedges 41 secured to the tilting frame 5, act to center the frame of the body on the frame 5 of the unit. At the same time, the lower flanges of the body guides 40 slip under the locking bars 42 of locks 43 that are mounted on opposite sides of the tilting frame 5 at the forward end portion thereof.

Provision may be made, if desired, for supporting the body in an elevated position, as illustrated in FIGS. 19 and 21. This may be desirable especially when the body is to be located adjacent a loading dock or other means for filling the container in such elevated position. To accomplish this action, we have provided front and rear legs 44 mounted on opposite sides of the body 4 adjacent the front and back thereof. The legs 44 may be in the form of plungers extending into cylinders 45 adapted for pneumatic or hydraulic operation, or other means, for projecting the legs downward from the container 4 in its seated position on the vehicle. The cylinders 45 are shown as extending vertically on opposite sides of the body 4 and are suitably secured thereto. When the legs 44 are projected therefrom into engagement with the ground or other supporting surface, the body can be lifted off the tilting frame in its horizontal position, without requiring tilting action thereof, and the vehicle is simply driven out from under the body in such position.

The legs 44 may be braced, if desired, by suitable means, generally indicated at 46, pivoted at 47 to the undercarriage of the body 4, and having clevis connections 48 with the lower end portions of the legs 44.

The cylinders 45 and also the braces 46 may be provided, if desired, with a series of holes 49 adapted for selectively receiving locking pins, which may be inserted therein for locking the legs 44 either in up or down positions.

*Operation*

The container 4 is adapted to be filled, separate and apart from the vehicle chassis, sitting on the ground or other supporting surface. The structure here involved may be used for transporting the container on the vehicle chassis to a remote point where it can be unloaded or where its contents can be removed, if desired, and the container then returned to a point of refilling. This enables the one truck chassis to service a number of containers, and yet it is possible for the containers to be of large size and capacity, comparable to the size and capacity of a vehicle body.

In picking up or loading the container or body, the vehicle is backed up to the front end portion of the body, as indicated in FIG. 1, and the tilting frame 5 is moved to an angle of about 45°. The carriage 13 is projected so as to move the bail 20 to its projected position, ready for engagement with the body.

If the body be provided with a gooseneck hook, as indicated at 37 in FIG. 17 or at 37' in FIG. 10, the bail 20 can be manipulated into engagement with such gooseneck hook for initial engagement of the body with the tilting frame. If not thus provided with such a hook, or if it not be needed for positioning the body, the bail can be moved into engagement with the first hook station A on the hook bar 28. The frame 5 is tilted down slightly on the pivots 7 to engage the bail 20 in the forward hook 29 of the first hook station A. The unit is now ready to pull the body onto the tilting frame.

Upon actuation of the cylinder 16, the bail 20 is moved forward through the length of one stroke of the cylinder, thereby drawing the body 4 lengthwise up on the tilting frame. The body or container 4 will rest by gravity in the position shown in FIG. 2, with its front end resting on the tilting frame 5 and with the runners 35 at the rear of the undercarriage resting on the ground or floor surface during the next stroke of the cylinder 16. Then the bail is moved back to engage the forward hook 29 of the hook station B by actuation of the cylinder 16, as illustrated in dotted lines in FIG. 2. This cycle is repeated and continued step-by-step until the body is moved up the tilting frame 5 in the manner illustrated in FIGS. 3, 4 and 5. The bail 20 engages successively the forward hooks of the hook stations B, C, D, and when in engagement with the latter, the container is shifted forward in horizontal position to its locked relation with the tilting frame, which previously has been moved down flat upon the vehicle chassis, after the weight of the container has been shifted onto the tilting frame.

By holding pressure on the cylinder 16, the bail will be held in the forward hook 29 of the final hook station D, thus locking the body or container in place on the vehicle chassis, both by the locking device 43 and by the action of the bail. This affords secure holding action of the container during transportation.

The action of the bail in engaging successively in the several stations is illustrated diagrammatically in FIG. 15. The bail 20 is spring pressed in an upward direction by the action of the spring 24 so that it rides along the lower edge of the hook bar 28. Thus, when it reaches each successive hook station, the spring tension applied to the bail causes it to snap up into the open hook 29. When the bail is in this position, the hook is engaged and the bail with the body thus attached is now moved lengthwise forward by the carriage 13 until the body is successively moved step-by-step to its seated position on the vehicle chassis.

After the bail has moved the body forward during each stroke of the carriage, the bail is then moved rearward relative to the body, being deflected out of the hook 29 and over the face of the shuttle 31, as illustrated also in FIG. 15. The action of the bail in pressing against the forward face of the shuttle 31 causes the latter to be closed over the hook 30 of the same station and thereby permits the bail to follow around the lower edge of the shuttle and to move downward and rearward past the shuttle and along the lower edge of the hook bar 28 to the next successive hook station. The sequence is then continued and repeated through the several hook stations until the body is in its final travel position on the truck frame.

To reverse the cycle and push the body off the truck frame, the carriage and bail are moved rearward until the bail passes under the shuttle and reaches a position just rearward of the lower edge of the shuttle, as shown in the diagrammatic illustration in FIG. 15. When the bail has reached that position, the cycle is reversed and the bail is then moved forward against the rearward face of the shuttle, which has dropped to its middle position by the action of gravity thereon and thereby guides the spring-pressed bail up into the throat of the hook 30, behind the shuttle. In this position, actuation of the cylinder 16 will cause the bail to push the body rearward through the stroke of the cylinder. This rearward movement is continued step-by-step through the several hook stations D, C, B and A, respectively. When the final station A has been reached, the body is off the truck frame. During this unloading action, the frame 5 should be tilted upward, as illustrated in FIGS. 1 to 4, whereby the container or body will be shifted lengthwise onto the ground or other supporting surface.

It will thus be apparent that the loading, as well as the unloading, action occurs automatically under control of the operator in the cab of the truck, without the necessity for having a man on the ground for attachment or detachment of the container with the truck. The entire operation can be accomplished effectively and quickly either for loading or unloading.

If it be desired to locate the container besides a loading dock, the container preferably should have suitable supporting legs thereon, an example of which is illustrated in FIGS. 19 and 21. In this position, the operator begins to move the body off the tilting frame 5, but as soon as the legs 44 are clear of the frame, they should be projected into engagement with the ground, so that the body will then rest on the rear legs and on the truck frame. As soon as the truck rear wheels are just forward of the front telescoping legs, the operator then projects the front legs into engagement with the ground and continues the step-by-step releasing of the container from the tilting frame of the truck. This operation should be carried out while gradually moving the truck from under the container, rather than by moving the container with respect to the truck, so that the container will rest on the front and rear legs in the desired position after being discharged therefrom.

While the invention has been illustrated and described in certain embodiments, it is recognized that other varia-

We claim:

1. In transporting equipment of the character described, the combination with a container part having a hook station on the container at the bottom thereof, of a supporting frame adapted to be mounted on a vehicle, a carriage part mounted on the frame for movement relative to the container part, one of said relatively movable parts including a bail member and the other relatively movable part including a pair of hooks arranged in opposed relation and open toward each other, said hook station also including a member movably supported between said pair of hooks for deflecting the bail member alternately from the respective hooks according to the direction of movement with respect thereto, so as to prevent the bail member from entering one hook while permitting the bail member to enter the other hook.

2. In transporting equipment of the character described, the combination with a container having a plurality of hook stations spaced at intervals along the bottom thereof, of a supporting frame adapted to be mounted on a vehicle chassis for swinging movement to raised and lowered positions with respect thereto, a carriage mounted on the frame for guided reciprocating movement along the frame, power means for causing reciprocating movement of the carriage, and a bail connected with the carriage in position for successive engagement with the hook stations on the container for moving the container step-by-step lengthwise relative to the frame, each of the hook stations including a pair of hooks arranged in opposed relation, and also including a member pivotally supported between said pair of hooks for deflecting the bail alternately from the respective hooks according to the direction of movement with respect thereto.

3. In equipment mounted on a vehicle, the combination of a container device adapted to be moved onto or off the vehicle, said container device having a first series of engagement surfaces by which the container device can be moved in one direction with respect to the vehicle and a second series of engagement surfaces by which the container devices can be moved in the opposite direction, a carriage mounted on the vehicle for guided back and forth movement with respect thereto, means on the carriage for connection sequentially with the engagement surfaces of either the first or the second series, power means for moving the connecting means forward and into connection with one engagement surface of one series and then back to move the container device one step and thereafter forward again and into connection with a second engagement surface of said series and thereafter back to move the container device a second step, and means for placing one series of engaging surfaces in a non-interfering condition during operation with the other series.

4. In equipment mounted on a vehicle, the combination of a container device adapted to be moved onto or off the vehicle, said container device having a first series of engagement means by which the container can be moved in one direction with respect to the vehicle and a second series of engagement means by which the container can be moved in the opposite direction, a carriage mounted on the vehicle for guided back and forth movement with respect thereto, a connecting member mounted on the carriage in position to engage either the first or the second series of engagement means for pulling or pushing, respectively, the container device in either direction, and power means for propelling the carriage and connecting member forward in one direction relative to the vehicle into engagement with one engagement means of one series and thereafter in the opposite direction relative to the vehicle to move the container device in the opposite direction, said power means thereafter moving the connecting member into engagement with another engagement means of the same series and then in the opposite direction to move the container device farther in the same direction, and means for placing one series of engagement means in non-interfering condition when the other series is being used.

5. In equipment mounted on a vehicle, the combination of a container device adapted to be moved onto or off the vehicle, said container device having a first series of engagement means by which the container device can be moved onto the vehicle and a second series of engagement means by which the container device can be moved off the vehicle, a carriage mounted on the vehicle for guided reciprocating movement with respect thereto, a connecting member mounted on the carriage in position to engage either the first or the second series of engagement means for pulling or pushing, respectively, the container device in either direction, and power means for propelling the carriage and connecting member in one direction relative to the vehicle into engagement with one engagement means of one series and then in the opposite direction to move the container device in said opposite direction and thereafter in said one direction into engagement with another engagement means of the same series and then in said opposite direction to move the container device farther in said opposite direction, and means for preventing the connecting member from engaging the second engagement means when the container device is being moved onto the vehicle and for preventing the connecting means from engaging the first engagement means when the container device is being moved off the vehicle.

6. In equipment mounted on a vehicle, the combination of a container adapted to be moved onto or off the vehicle, said container having a plurality of hook stations spaced-apart beneath the bottom thereof, each of the hook stations including a pair of hook surfaces arranged in opposed relation, a carriage mounted on the vehicle for guided reciprocating movement with respect thereto, a bail mounted on the carriage in position to connect with the hook surfaces, means for preventing the bail from engaging respective hook surfaces depending on the direction the container is to be moved, and power means including an hydraulic cylinder for propelling the carriage and bail in reciprocating movement into engagement of the bail with a hook surface of one hook station to move the container in one direction, and to disengage therefrom and thereafter to engage the corresponding hook surface of another hook station to move the container farther in the same direction.

7. In equipment mounted on a vehicle, the combination of a container adapted to be moved onto or off the vehicle, said container having a plurality of hook stations spaced-apart thereon, each of the hook stations including a pair of hook surfaces arranged in opposed relation, a carriage mounted on the vehicle for guided reciprocating movement with respect thereto, a bail mounted on the carriage in position to engage the hook surfaces, means for preventing the bail from engaging respective hook surfaces depending on the direction the container is to be moved, said means comprising a shuttle pivotally supported between each opposed hook surface, and power means for propelling the carriage and bail in reciprocating movement whereby the bail engages a hook surface of one hook station to move the container in one direction, disengages therefrom upon movement guided by the shuttle and engages the corresponding hook surface of another hook station to move the container farther in the same direction.

8. In equipment mounted on a vehicle, the combination of a supporting frame mounted on the vehicle for swinging movement to raised and lowered positins with respect thereto, a container adapted to be moved onto or off the frame, said container device having a first series of engagement means by which the container can be moved in one direction with respect to the vehicle and a second series of engagement means by which the container can be moved in the opposite direction, a carriage mounted on the frame for guided reciprocating movement with respect thereto, a connecting member mounted on the carriage in position to engage either the first or the second engagement means for pulling or pushing, respectively, the container device in either direction, means for placing one series of engagement means in non-interfering condition when the other series is being used, and power means for propelling the carriage and connecting member in reciprocating movement whereby the connecting member engages one engagement means in one series to move the container device in one direction, disengages therefrom and engages another engagement means in the same series to move the container device farther in the same direction.

9. In equipment mounted on a vehicle, the combination of a supporting frame mounted on the vehicle for swinging movement to raised and lowered positions about an axis spaced rearwardly thereof, a container mounted on the frame, said container having a plurality of hook devices spaced along the bottom thereof lengthwise of the supporting frame, said hook devices having open throats toward the rear of the vehicle, a carriage mounted on the frame for movement back and forth therealong, said carriage having a bail thereon including a portion disposed in embracing relation around one of the hook devices and in the throat thereof, power means for moving the carriage inwardly along the supporting frame with the bail in one position for engagement with one hook device of said plurality to move the container inwardly of the vehicle one step along the supporting frame and thereafter moving the bail outwardly and into engagement with a second hook device of said plurality for moving the container inwardly in a second step, and means for lifting the inner end portion of the supporting frame for discharging the container therefrom.

10. In a device of the character described for moving a container, the combination of two relatively movable parts, one of said parts having a bail thereon and the other relatively movable part having a hook station comprising a pair of hook members in opposed relation to each other and open towards each other to receive the bail in either hook, a shuttle between said hook members, and means mounting the shuttle to swing the shuttle over each of the respective hook members closing it off to prevent the bail from engaging one hook member while allowing the bail to enter and engage the other hook member to move the container.

11. A container structure of the character described comprising an elongated hook bar, said hook bar having a plurality of hook stations spaced at intervals therealong, each of said hook stations including a pair of hook members in opposed relation to each other open to the bottom edge of the hook bar, and a shuttle suspended between the hook members, said shuttle adapted to swing over a hook member closing it off to prevent a connecting device from entering the hook station, or adapted to allow the connecting device to enter the hook station to engage one of the hook members for causing movement of the container.

References Cited in the file of this patent
UNITED STATES PATENTS

| | | |
|---|---|---|
| 1,280,141 | Bonner | Oct. 1, 1918 |
| 1,736,935 | Navarre | Nov. 26, 1929 |
| 1,821,327 | Scott | Sept. 1, 1931 |
| 2,521,727 | Kappen | Sept. 12, 1950 |
| 2,591,153 | Hodges | Apr. 1, 1952 |
| 2,708,047 | Seidle | May 10, 1955 |
| 2,728,471 | Jones | Dec. 27, 1955 |
| 2,867,339 | Nelson | Jan. 6, 1959 |
| 2,963,185 | Jones et al. | Dec. 6, 1960 |